United States Patent Office 3,507,779
Patented Apr. 21, 1970

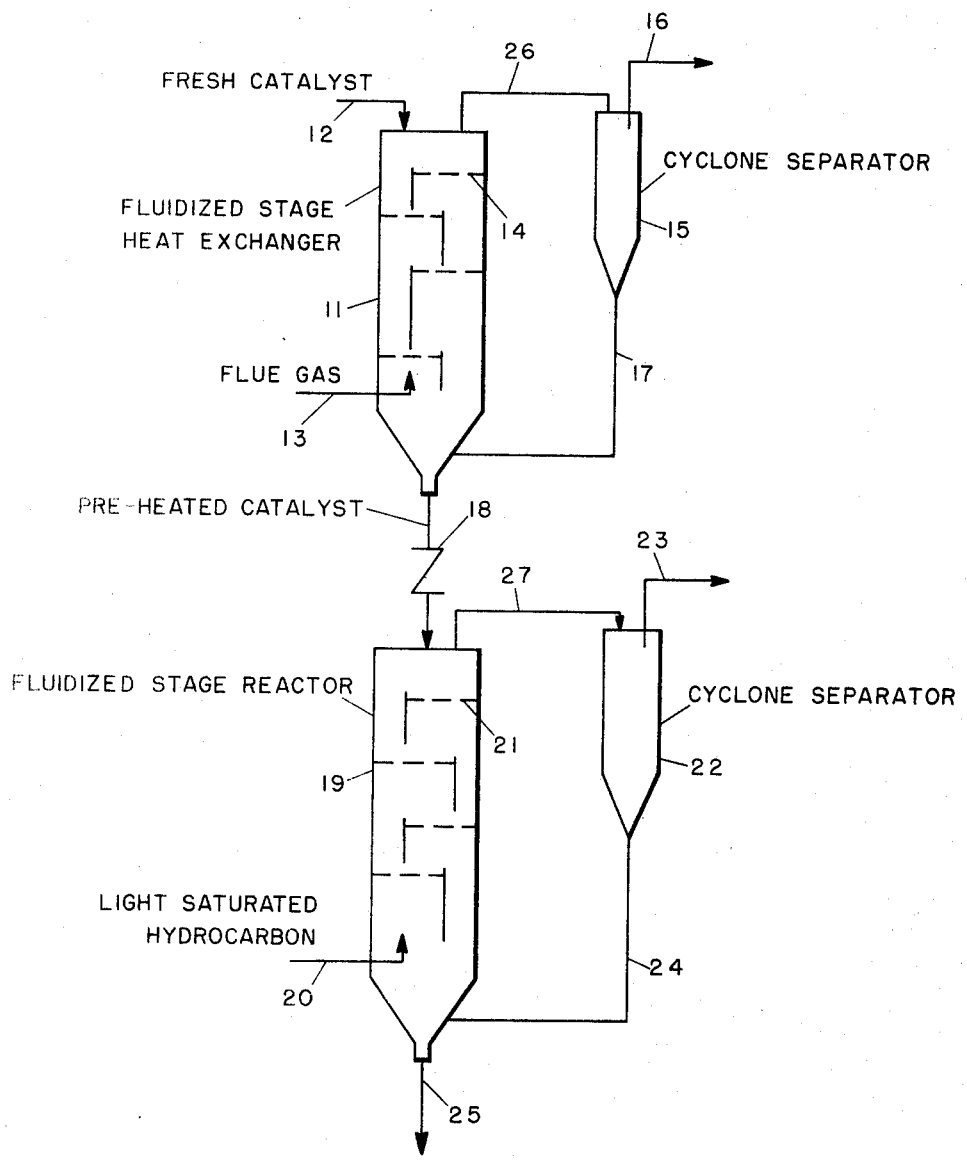

3,507,779
PROCESSES FOR IMPROVING CATALYTIC
CRACKING OF GAS OILS
Robert A. Baillie, West Chester, and Harold F. Tse, Bala Cynwyd, Pa., assignors to Sun Oil Company, Philadelphia, Pa., a corporation of New Jersey
Filed May 9, 1968, Ser. No. 727,874
Int. Cl. C10g 13/02
U.S. Cl. 208—120        3 Claims

ABSTRACT OF THE DISCLOSURE

A process for improving molecular sieve catalyst performance in a catalytic cracking process wherein the catalyst is first preheated and then subjected to a pre-cracking reaction with a light saturated hydrocarbon before entering into the basic cracking process.

---

This invention relates to a process of improved catalytic cracking of gas oils and, more particularly, to improved catalyst performance.

The catalytic cracking or conversion of hydrocarbons has been employed extensively for a number of years to produce high octane gasoline from higher boiling oils. In the cracking process, the catalyst is circulated through a reaction cracking zone and then through a regeneration zone for the removal of carbonaceous material or, as it is commonly known, coke, which is deposited on the catalyst during the cracking step. The removal of the carbonaceous deposits is generally accomplished by burning the catalyst as it is continuously supplied to the regeneration zone with air or an oxygen-containing gas in one or more regenerative steps. In the regeneration, it is necessary that the catalyst be sufficiently heated by the burning of the coke to subsequently sustain the endothermic hydrocarbon cracking reaction; however, if the regeneration temperature is too high, extensive damage can be wrought to the catalyst.

The problem of overheating the catalyst has become more acute with the advent of fluid molecular sieve catalysts in the catalytic cracking processes. Molecular sieves are crystalline, three dimensional aluminosilicates of the zeolite mineral group which have proven to be extremely active cracking catalysts. The useful properties of the molecular sieve zeolites stem from their crystal structure, which is characterized by a three dimensional lattice of $SiO_4$ and $AlO_4^-$ tetrahedra joined by mutual oxygen atoms, a large surface area within the cavities produced by the lattice, and a highly polar surface. Various aspects of these catalysts are disclosed in U.S. Patents 3,140,253, 3,210,267, and 3,252,889.

The molecular sieve catalysts are extremely active, and it has been estimated that they are six to eight times as active as the conventional amorphous silica-alumina catalysts. The use of the catalyst is characterized by high gasoline yield and conversion with lower gas production than the conventional catalysts. However, it has become apparent that the industry is not utilizing these new catalysts to their best advantage, for although the catalyst is extremely active at the outset of its employment, this high activity is rapidly lost. Although the activity of the catalyst is not completely destroyed, the loss of the aforementioned superior activity has proven very costly.

One of the primary distinct factors which is depressing the performance of the catalyst is the deterioration which occurs during its first pass through the system. During the first pass of the catalyst through the reaction zone, cracking takes place rapidly on the virgin particle due to its extremely high activity. Reaction is so fast that a large amount of coke builds up on the new particle in preference to any less active catalyst present. As this coke is burned off, the pellet temperature often far exceeds the bulk temperature in the regenerator, and laboratory analyses suggest that the catalyst surface temperatures exceed 1600° F. This will often cause the lattice of the catalyst to collapse and the catalysts to fuse. This action, in turn, decreases the surface area of the catalyst and decreases the catalyst activity.

Heretofore, several U.S. patents have issued related to this severe problem. Most recently, U.S. Patent 3,351,548 has issued, and it discloses a process in which spent catalyst from a reaction zone is combined with freshly regenerated catalyst to form a mixture of at least 1000° F., and then the catalyst is regenerated under conditions to retain approximately 0.5% by weight of residual coke. The regeneration conditions are such that temperatures not exceeding 1500° F. are obtained. U.S. Patent 3,347,778 has also recently issued and discloses a method of arranging process steps so that the catalyst maintains a uniform activity throughout each step of the process and thus secures an effective and efficient utilization of the catalyst activity.

Thus, it is the overall object of this invention to improve molecular sieve catalyst performance in the catalytic cracking process.

Moreover, it is the object of this invention to maintain catalytic activity, particularly of the new cracking catalyst which is to be added to the process.

These and other objects of the invention will become readily apparent as the invention is more fully disclosed.

In accordance with the objects of this invention, it has been discovered that by subjecting the catalyst to a pre-cracking reaction using a light saturated hydrocarbon feed, the permanent deactivation of the catalyst can be prevented. For purposes of this invention, the term "light saturated hydrocarbon" refers to a hydrocarbon that boils below 400° F. and contains less than 5% by volume of unsaturated hydrocarbons. Preferably, the hydrocarbon contains less than 5% by volume of aromatic compounds and contains no aromatics having two or more fused-ring structures. It is necessary to maintain low concentrations of such aromatics, particularly multi-ringed structures, due to the great difficulty encountered in attempting to burn off the coke deposited by these compounds. The difficulties encountered when a feed stock of such a nature is employed is disclosed in U.S. Patent 2,701,231. The most preferred compound is one which is fully saturated. Prior to subjecting the catalyst to the light saturated hydrocarbon, the catalyst should be preheated to approximately 600° to 900° F.

The accompanying drawing illustrates diagrammatically apparatus which could be adapted for carrying out the objects of this invention.

Referring to the drawing, 11 is a fluidized stage heat exchanger and 19 is a fluidized stage reactor. Fresh virgin molecular sieve catalyst enters the top of the heat exchanger 11 through conduit 12 and passes downwardly around sieve plates 14 within the exchanger. Flue gas which is at approximately 1200° F. then enters the heat exchanger 11 through conduit 13 and flows countercurrently with the fresh catalyst and heats the catalyst to approximately 800° F. The flue gas entrained with some catalyst passes out of the exchanger through line 26 and into a cyclone separator 15. In the cyclone, the entrained catalyst particles are separated from the flue gas, and the particles leave the separator through conduit 17 and reunite with the catalyst at the bottom of the exchanger. The catalyst-free flue gas leaves the cyclone through line 16 for subsequent refinery use.

The heated fresh catalyst now passes via a seal valve 18 into the fluidized stage reactor 19. As the heated catalyst passes downwardly in the reactor around sieve plates 21, a light saturated hydrocarbon, as hereinbefore described, flows countercurrently through the reactor and contacts the catalyst. The hydrocarbon enters the reactor through conduit 20. As the heated catalyst and the light saturated hydrocarbon contact each other, a mild cracking reaction takes place and a minor amount of coke is deposited on the catalyst. The cracking reaction will generally cause the formation of olefins. The light unreacted hydrocarbon and the olefin product then pass out of the reactor through line 27 and enter the cyclone separator 22 where entrained catalyst is separated and returned to the reactor via line 24. The light hydrocarbon and the olefins leave the cyclone through line 23 and, if desired, can be subsequently processed to separate the olefins therefrom. The coked catalyst leaves the reactor through line 25 and is passed, wherever desired, to either the regenerator or the stand pipe (neither being shown in the figure) for entrance into the basic refinery cracking process.

Concurrently with the aforedescribed precracking reaction or immediately subsequent thereto, the catalytic cracking apparatus is subject to startup procedures which are well known in the art. Such startup procedures are fully disclosed in the prior art as exemplified by U.S. Patents 3,012,962 and 2,391,366.

Any light saturated hydrocarbons which meet the requirements as previously set are operable for the instant invention. However, based on economic considerations and efficiency of operation, the preferred hydrocarbon is one which has had the aromatics removed therefrom during extraction or other similar refinery procedures. An example of such would be the raffinate obtained through the glycol extraction of an aromatic stock obtained by the fractionation of a catalytically reformed straight run gasoline. This raffinate is comprised of approximately 96 to 97 volume percent of saturated hydrocarbons and 3 to 4 volume percent aromatics, wherein all the aromatics are single-ring compounds. The raffinate boils in the range from 160° to 280° F.

By carrying out this pretreatment of the catalyst, we are able to produce a minor amount of coke on the catalyst which will reduce the initial activity but at the same time prevents permanent harm to the catalyst. This is because the precoked catalyst will not be subject to the overabundance of coke generally produced when the virgin catalyst is passed through the reactor during the first pass. As a result thereof, the catalyst will not be destroyed upon regeneration. Upon regeneration, minor amounts of residual coke, such as disclosed in U.S. Patent 3,351,548, can be left on the catalyst to prevent subsequent deactivation of the catalyst.

As can readily be appreciated by one skilled in the art, while the particular compositions and methods of application described herein are well adapted to meet the objects of the present invention, various modifications or changes may be resorted to without departing from the scope of the invention as defined in the claims.

We claim:

1. A method for improving molecular sieve catalyst performance in a catalytic cracking process consisting essentially of contacting a hydrocarbon with a catalyst in the absence of added hydrogen which comprises preheating a fresh virgin molecular sieve catalyst to approximately 600° to 900° F., subjecting the preheated catalyst to a precracking reaction with a light saturated hydrocarbon that boils below 400° F. and contains less than 5% by volume of unsaturated hydrocarbons, and then entering the pretreated molecular sieve catalyst into the basic cracking process.

2. A method as described in claim 1 wherein the light saturated hydrocarbon contains less than 5% by volume of aromatic compounds.

3. A method as described in claim 2 wherein the light saturated hydrocarbon contains no aromatics having two or more fused-ring structures.

References Cited
UNITED STATES PATENTS 3,424,671  1/1969  Kay _____ 208—59

DELBERT E. GANTZ, Primary Examiner

ABRAHAM RIMENS, Assistant Examiner

U.S. Cl. X.R.

208—119